United States Patent
Chung et al.

(10) Patent No.: US 11,472,292 B2
(45) Date of Patent: Oct. 18, 2022

(54) DETACHABLE MANIPULATION SYSTEM USING AN ELECTROMAGNET AND A METHOD OF CONTROLLING THE SAME

(71) Applicants: HYUNDAI MOTOR COMPANY, Seoul (KR); KIA MOTORS CORPORATION, Seoul (KR)

(72) Inventors: Jae Hoon Chung, Hwaseong-si (KR); Sung Un Kim, Yongin-si (KR); Si Hoon Sung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 315 days.

(21) Appl. No.: 16/940,949

(22) Filed: Jul. 28, 2020

(65) Prior Publication Data

US 2021/0043349 A1    Feb. 11, 2021

(30) Foreign Application Priority Data

Aug. 6, 2019    (KR) .................. 10-2019-0095555

(51) Int. Cl.
*H01F 7/06*    (2006.01)
*B60K 35/00*   (2006.01)

(52) U.S. Cl.
CPC ........ *B60K 35/00* (2013.01); *B60K 2370/115* (2019.05); *B60K 2370/126* (2019.05)

(58) Field of Classification Search
CPC .. B60K 35/00; B60K 37/06; B60K 2370/115; B60K 2370/126
See application file for complete search history.

(56) References Cited

U.S. PATENT DOCUMENTS

| | | | |
|---|---|---|---|
| 10,556,507 B2 * | 2/2020 | Park .................... | B60R 11/0229 |
| 2011/0084567 A1 * | 4/2011 | Ichiyama ............. | H02K 21/042 |
| | | | 310/181 |
| 2013/0199881 A1 * | 8/2013 | Sano ..................... | F16D 63/002 |
| | | | 188/267 |
| 2018/0154774 A1 * | 6/2018 | Park ....................... | G06F 3/017 |
| 2018/0298959 A1 * | 10/2018 | Battlogg ............... | F16D 57/002 |
| 2018/0370365 A1 * | 12/2018 | Lee ........................ | B60K 37/06 |
| 2020/0046330 A1 * | 2/2020 | Brasey ................ | A61B 17/1626 |
| 2020/0189392 A1 * | 6/2020 | Sung ..................... | H01F 7/0252 |
| 2021/0039496 A1 * | 2/2021 | Sung ....................... | G10L 15/22 |
| 2021/0235552 A1 * | 7/2021 | Jung ..................... | H05B 1/0266 |

\* cited by examiner

*Primary Examiner* — Christopher E Leiby
(74) *Attorney, Agent, or Firm* — Lempia Summerfield Katz LLC

(57) ABSTRACT

A manipulation system capable of controlling various functions in a vehicle includes a detachable rotary manipulation system capable of corresponding to various manipulation environments using an electromagnet and a method of controlling the same. The method includes determining whether a rotary manipulation unit having a plurality of magnets disposed thereat has been attached based on a change in current of a plurality of electromagnetic coils disposed at an attachment unit and controlling whether to activate at least some of the plurality of electromagnetic coils based on at least one of the number of clicks per rotation corresponding to a function to be controlled or a manipulation system type of the rotary manipulation unit upon determining that the rotary manipulation unit has been attached.

19 Claims, 10 Drawing Sheets

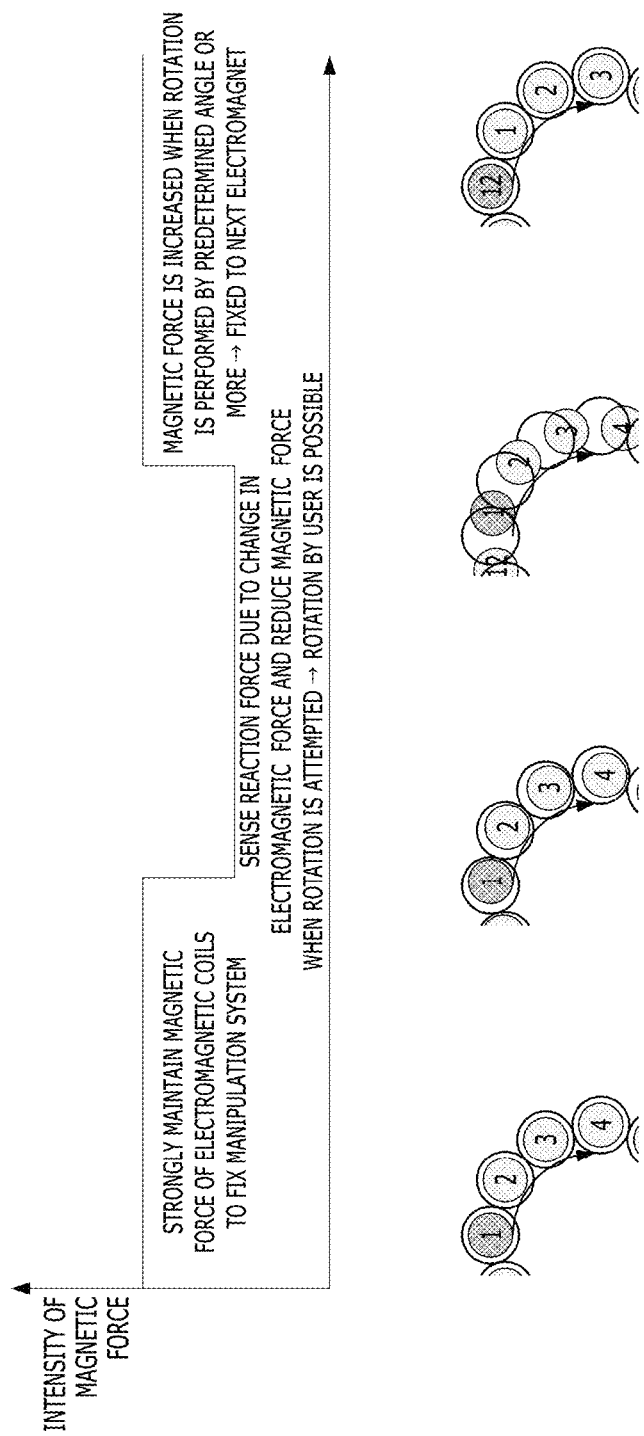

FIG. 4(a)
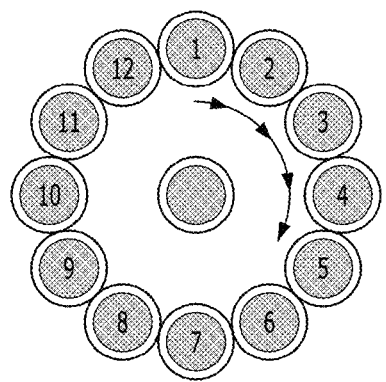
MAGNETIC FORCE OF EXISTING
ELECTROMAGNET IS INCREASED
WHEN ROTATION IS PERFORMED BY
PREDETERMINED ANGLE OR MORE →
RETURN TO PREVIOUS ELECTROMAGNET
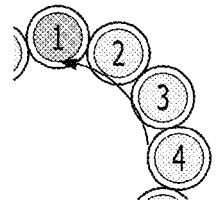
FIG. 4(b)
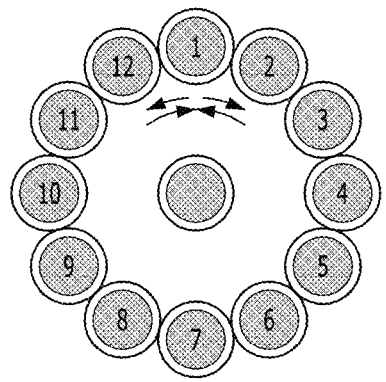
FIG. 4(c)

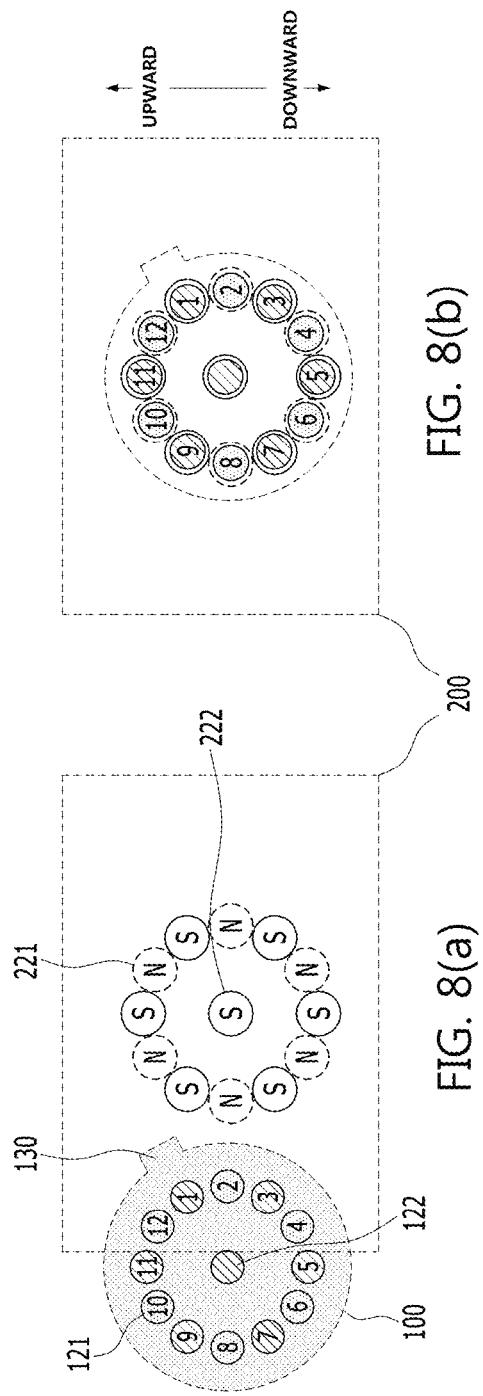
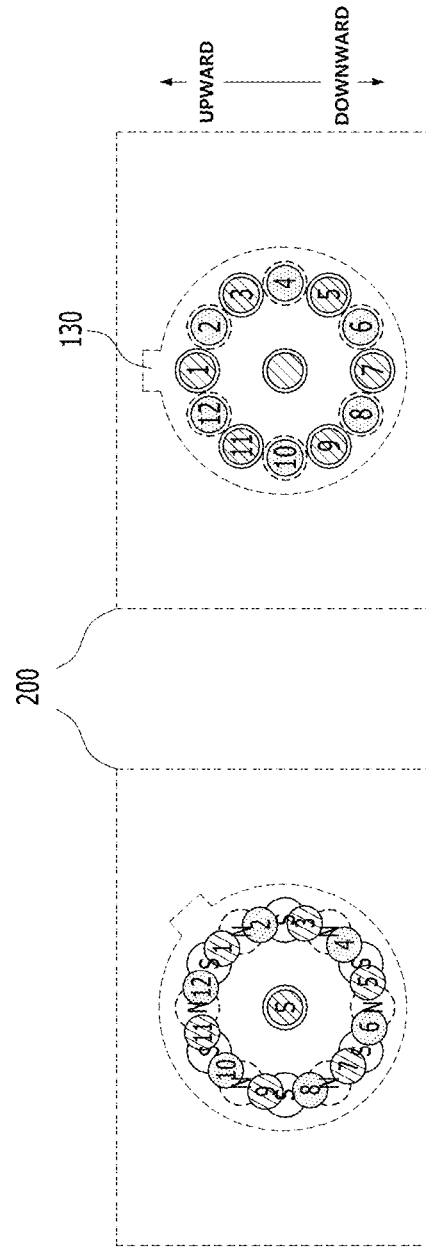

DETACHABLE MANIPULATION SYSTEM USING AN ELECTROMAGNET AND A METHOD OF CONTROLLING THE SAME

This application claims the benefit of priority to Korean Patent Application No. 10-2019-0095555, filed on Aug. 6, 2019, the entire content of which is hereby incorporated by reference as if fully set forth herein.

BACKGROUND

Field of the Disclosure

The present disclosure relates to a manipulation system capable of controlling various functions in a vehicle, and more particularly to a detachable manipulation system capable of corresponding to various manipulation environments using an electromagnet and a method of controlling the same.

Discussion of the Related Art

A rotary manipulation system is a manipulation system that generally has a dial form and is manipulated so as to be rotated about a central axis, and is utilized as a multi-purpose manipulation indicator, since the manipulation system is intuitive and various functions can be integrated.

In a vehicle, the rotary manipulation system is used to manipulate an object to be controlled having a continuous control amount, such as volume and temperature, and is used as an integrated manipulation system, such as a driver information system (DIS) or a central control point (CCP), in order to reduce the number of buttons.

In a general rotary manipulation system, however, it is not possible to change i) a manipulation step per rotation (e.g. 360 degrees), ii) torque necessary to rotate an angle corresponding to a single manipulation step, iii) a disposition position, or iv) a manipulation type, such as endless, self-return, or rotary, after design.

Meanwhile, it is expected that, in a future vehicle environment, a boundary between a driver and a passenger will gradually disappear with advance of autonomous driving technology and a seat is freely variable, and thus the position and posture of the passenger also become free. In addition, demand for a customized user interface may further increase due to deepening of personalization.

Therefore, there is a need for a manipulation system capable of being detachably attached to a desired position irrespective of position or posture and corresponding to various user interface forms while solving the above-described shortcomings of the general rotary manipulation system.

SUMMARY

Accordingly, the present disclosure is directed to a detachable manipulation system using an electromagnet and a method of controlling the same that substantially obviate one or more problems due to limitations and disadvantages of the related art.

An object of the present disclosure is to provide a detachable rotary manipulation system with improved convenience and a method of controlling the same.

Another object of the present disclosure is to provide a rotary manipulation system capable of corresponding to various control environments and a method of controlling the same.

Objects of the present disclosure devised to solve the problems are not limited to the aforementioned object, and other unmentioned objects should be clearly understood by those having ordinary skill in the art based on the following detailed description of the present disclosure.

To achieve these objects and other advantages and in accordance with the purpose of the disclosure, as embodied and broadly described herein, a method of controlling a detachable rotary manipulation system may include determining whether a rotary manipulation unit having a plurality of magnets disposed thereat has been attached based on a change in current of a plurality of electromagnetic coils disposed at an attachment unit. The method may further include controlling whether to activate at least some of the plurality of electromagnetic coils based on at least one of the number of clicks per rotation corresponding to a function to be controlled or a manipulation system type of the rotary manipulation unit upon determining that the rotary manipulation unit has been attached.

In another aspect of the present disclosure, a manipulation apparatus for vehicles may include a plurality of electromagnetic coils disposed along an attachment unit and a controller. The controller may be configured to determine whether a rotary manipulation unit having a plurality of magnets disposed thereat has been attached based on a change in current of the plurality of electromagnetic coils. The controller may be further configured to control whether to activate at least some of the plurality of electromagnetic coils based on at least one of the number of clicks per rotation corresponding to a function to be controlled or a manipulation system type of the rotary manipulation unit upon determining that the rotary manipulation unit has been attached.

It should be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure, and together with the description, serve to explain the principle of the disclosure. In the drawings:

FIGS. 3(a)-3(e) are views showing an example of a magnetic force control form of the rotary manipulation system according to the embodiment of the present disclosure during rotation;

FIGS. 4(a)-4(c) are views showing an example of the magnetic force control form of the rotary manipulation system according to the embodiment of the present disclosure depending on manipulation system type;

FIGS. 8(a)-8(d) are views showing an example of the magnetic force control form of the rotary manipulation system according to the embodiment of the present disclosure for forward directional alignment;

DETAILED DESCRIPTION

Figure 1:
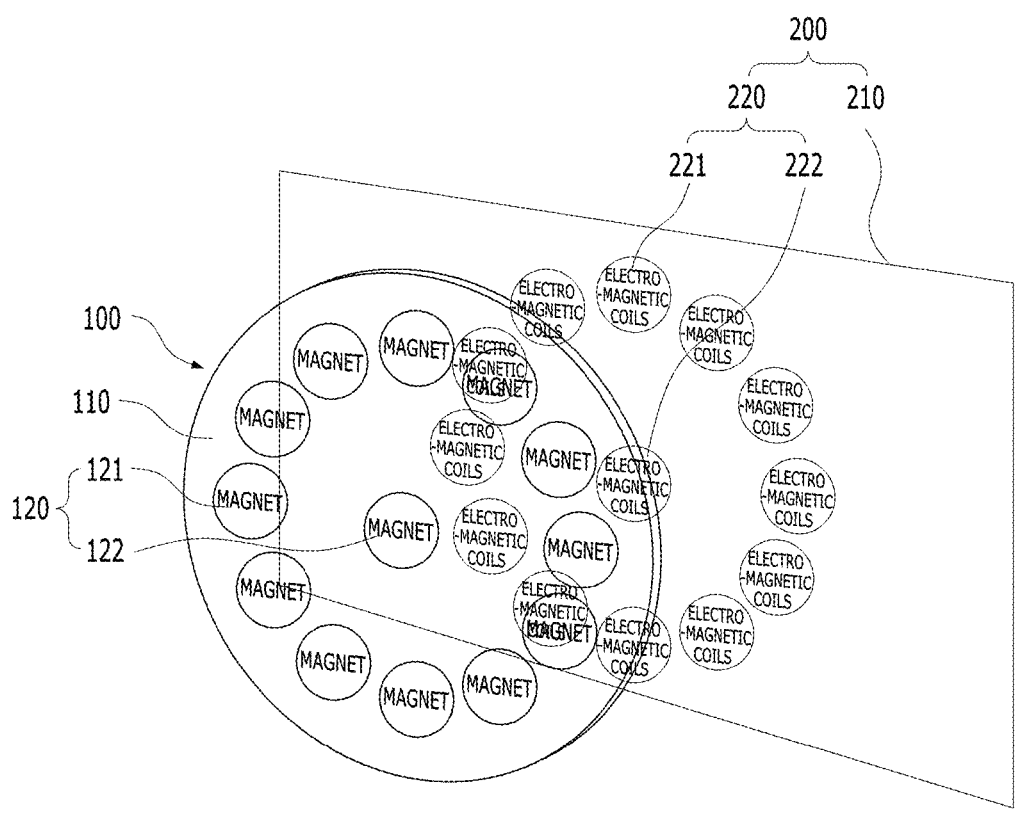
FIG. 1 is a view showing an example of the construction of a rotary manipulation system using an electromagnet according to an embodiment of the present disclosure.

Reference is now made in detail to the embodiments of the present disclosure, examples of which are illustrated in the accompanying drawings. The following embodiments are given by way of example in order to enable those having ordinary skill in the art to fully understand the idea of the present disclosure. Therefore, the present disclosure is not limited by the following embodiments and may be realized in various other forms. In order to clearly describe the present disclosure, parts having no relation with the description of the present disclosure have been omitted from the drawings. Wherever possible, the same reference numerals are used throughout the specification to refer to the same or equivalent parts.

The term "comprises" or "includes" used herein should be interpreted not to exclude other elements but to further include such other elements, unless mentioned otherwise. In addition, the same reference numerals denote the same or equivalent constituent elements throughout the specification. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation, function, operation, or the like.

In an embodiment of the present disclosure, sensing and fixing of a rotary manipulation system using electromagnets and changing a control form of the rotary manipulation system based on an object to be controlled in controlling vehicle functions are proposed.

First, the construction of a rotary manipulation system, which may be applied to embodiments of the present disclosure, is described with reference to FIG. 1. FIG. 1 is a view showing an example of the construction of a rotary manipulation system using an electromagnet according to an embodiment of the present disclosure.

Referring to FIG. 1, the rotary manipulation system according to the embodiment of the present disclosure may include a manipulation unit 100 and an attachment unit 200.

The manipulation unit 100 may include a body 110 and a plurality of magnets 120 disposed at the body 110. In addition, the attachment unit 200 may include an attachment surface 210 and a plurality of electromagnetic coils 220 disposed at the attachment surface 210. Although not shown, the attachment unit 200 may further include a controller configured to apply electric power to at least some of the plurality of electromagnetic coils 220 in order to perform control such that the electromagnetic coils 220 can act as N-pole or S-pole electromagnets. The controller may further be configured to sense a change in current of at least some of the electromagnetic coils 220 depending on a change in external magnetic force. The attachment unit 200 may be referred to as a "manipulation apparatus for vehicles," since the attachment unit 200 is constantly disposed at a vehicle side.

Hereinafter, respective components are described in detail.

First, the body 110 may have a cylindrical or disc-shaped external appearance so as to be suitable for rotary manipulation. Of course, this is an illustrative example, and the present disclosure is not limited as to the external appearance of the body 110. In another embodiment, however, the surface of the body 110 opposite the attachment surface 210 may be flat so as to be smoothly rotatable.

The plurality of magnets 120 may be disposed in the body 110 or at the surface of the body 110 opposite the attachment surface 210. However, the present disclosure is not limited thereto. In another embodiment, however, each of the plurality of magnets 120 is disposed so as to be parallel to the attachment surface 210 or the surface of the body 110 opposite the attachment surface 210. In addition, the plurality of magnets 120 may include a plurality of peripheral magnets 121 and a central magnet 122. The plurality of peripheral magnets 121 may be radially disposed about the central magnet 122 or may be disposed so as to form a concentric circle having the central magnet 122 as the central point.

Next, the attachment surface 210 of the attachment unit 200 may be disposed at various positions in a vehicle in consideration of the position and posture of a vehicle passenger and functions to be controlled. For example, the attachment surface 210 may be attached to a seat, a console, a display, a steering wheel, or the like. However, the present disclosure is not limited thereto. In another embodiment, the attachment surface 210 is generally flat. However, the area of the attachment surface 210, other than the area of the attachment surface 210 that overlaps the manipulation unit 100 when the manipulation unit 100 is attached to the attachment surface 210, may be curved or uneven.

The plurality of electromagnetic coils 220 may be disposed on the attachment surface 210 or at the rear of the portion of the attachment surface 210 exposed outside. However, the present disclosure is not limited thereto. In another embodiment, however, each of the plurality of electromagnetic coils 220 is disposed so as to be parallel to the attachment surface 210. In addition, the electromagnetic coils 220 may include a plurality of peripheral electromagnetic coils 221 and a central electromagnetic coil 222. The plurality of peripheral electromagnetic coils 221 may be radially disposed about the central electromagnetic coil 222 or may be disposed so as to form a concentric circle having the central electromagnetic coil 222 as the central point. In another embodiment, the distance between the central electromagnetic coil 222 and each peripheral electromagnetic coil 221 is equal to the distance between the central magnet 122 and each peripheral magnet 121. Also in another embodiment, the angle between the respective peripheral electromagnetic coils 221 has a multiple relationship with the angle between the respective peripheral magnets 121. For example, the angle between the respective peripheral electromagnetic coils 221 may be equal to the angle between the respective peripheral magnets 121. Thus, the magnets 120 and the electromagnetic coils 220 have a one-to-one correspondence such that the magnets 120 completely overlap the electromagnetic coils 220 when viewed from the front after attachment. In another example, the angle between the respective peripheral magnets 121 may be 60 degrees and the angle between the respective peripheral electromagnetic coils 221 may be 30 degrees so as to have a 1:2 correspondence relationship.

The controller (not shown) of the attachment unit 200 is sufficient to be electrically connected to each of the plurality of electromagnetic coils 220. The controller does not need to be disposed adjacent to the attachment surface 210 or the electromagnetic coils 220.

In some embodiments, the central electromagnetic coil 222 may be replaced with a permanent magnet.

Figure 2:
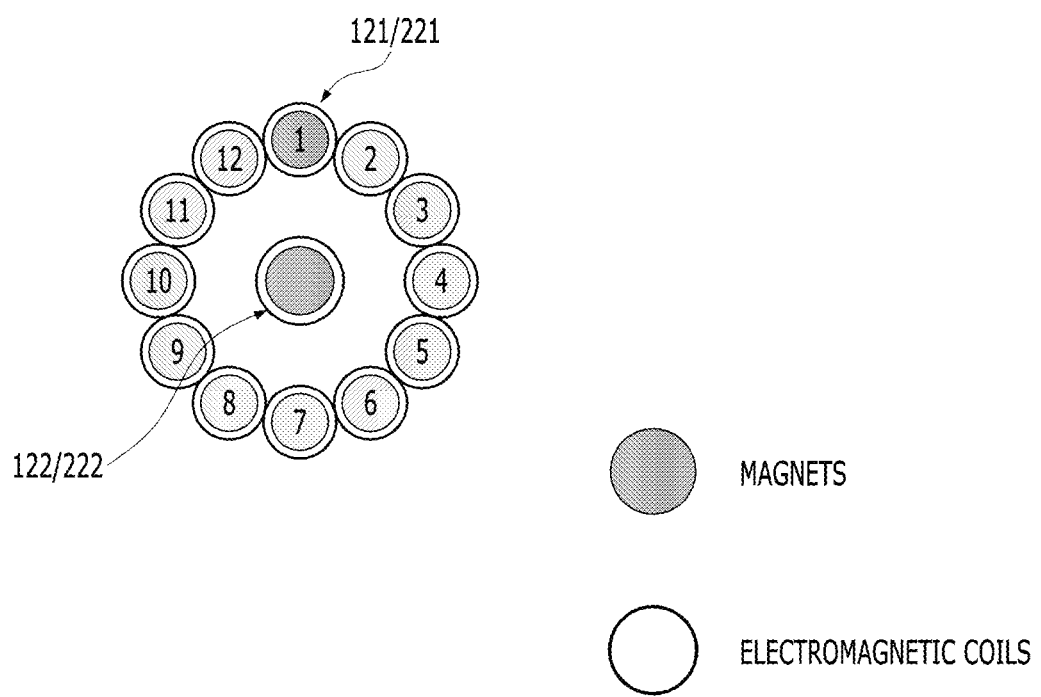
FIG. 2 is a view showing an example of a fixed form of the rotary manipulation system according to the embodiment of the present disclosure.

FIG. 2 is a view showing an example of a fixed form of the rotary manipulation system according to the embodiment of the present disclosure. In the following embodiments including FIG. 2, it is assumed that a single central magnet 122 and a single central electromagnetic coil 222 are provided. Twelve peripheral magnets 121 and twelve peripheral electromagnetic coils 221 are provided so as to have an angle of 30 degrees between respective peripheral magnets 121 and between respective peripheral electromagnetic coils 221. The magnets 120 overlap the electromagnetic coils 220 so as to have a one-to-one correspondence relationship when the manipulation unit 100 is attached to the attachment surface 210 of the attachment unit 200. In addition, the "electromagnetic coils" may also be referred to as "electromagnets" for the sake of convenience.

In FIG. 2, only the electromagnetic coils 220 and the magnets 120 are shown for clear understanding. Referring to FIG. 2, attractive force is constantly applied between the central magnet 122 and the central electromagnet 222. Thus, the central magnet 122 and the central electromagnet 222 may function as a rotary shaft for rotary manipulation of the manipulation unit 100.

In addition, attractive force between the central magnet 122 and the central electromagnet 222 may be equal to or greater than attractive force between the peripheral magnets 121 and the peripheral electromagnets 221.

FIGS. 3(a)-3(e) are views showing an example of a magnetic force control form of the rotary manipulation system according to the embodiment of the present disclosure during rotation.

Referring to FIGS. 3(a)-3(e), a graph is shown in FIG. 3(e) and manipulation states of the rotary manipulation system are shown in FIGS. 3(a)-3(d). Specifically, the horizontal axis of the graph in FIG. 3(e) corresponds to a change in manipulation states of FIGS. 3(a)-3(d). The vertical axis in FIG. 3(e) indicates the intensity of magnetic force generated by the peripheral electromagnets 221.

First, in the state in which a user does not manipulate the manipulation unit 100, as shown in FIG. 3(a), the controller of the attachment unit 200 applies current having first magnitude to the peripheral electromagnets 221 to fix the manipulation unit 100 so as not to be moved by vibration of the vehicle. In the case in which the user attempts to perform rotary manipulation, as shown in FIG. 3(b), the controller may determine whether the user intends to rotate the manipulation unit 100 based on a change in current of each electromagnet generated by reaction force. The reaction force is caused by a change in magnetic force when the body of the user contacts the body 110 of the manipulation unit 100 and the user attempts to rotate the manipulation unit 100. As a result, as shown in FIG. 3(c), the controller may apply current having second magnitude, which is less than the first magnitude, to the peripheral electromagnets 221 to reduce magnetic force and thus to assist smooth rotation while the rotation of the manipulation unit 100 is sensed due to a change in current. In addition, when rotation is performed by a predetermined angle (e.g. an angle corresponding to one click based on a current object to be controlled or the angle between the respective peripheral electromagnets) or more, as shown in FIG. 3(d), the controller increases magnetic force such that the manipulation unit 100 is fixed to the next magnet-electromagnet alignment position. At this time, the controller may determine the rotational direction and rotational angle of the manipulation unit 100 based on a change in current of the peripheral electromagnets 221. The controller may also control a current function to be controlled based on the determined rotational direction and rotational angle.

Meanwhile, the controller of the attachment unit 200 may change the type of the manipulation system using the principle by which the intensity and direction of magnetic force generated by the electromagnets are changed depending on application of current. In other words, the manipulation unit 100 is differently moved depending on the type of electric power applied to the peripheral electromagnets 221 when being rotated by a predetermined angle or more. This is described with reference to FIGS. 4(a)-4(c).

FIGS. 4(a)-4(c) are views showing an example of the magnetic force control form of the rotary manipulation system according to the embodiment of the present disclosure depending on manipulation system type.

First, the manipulation unit 100 is stopped at the next click in the rotational direction (i.e. at the position at which the peripheral magnets 121 and the peripheral electromagnets 221 overlap to form pairs) at the time of every rotation by a predetermined angle according to the controller controlling the electromagnets as shown in FIGS. 3(a)-3(e) or by increasing the intensity of the next peripheral electromagnet in a direction identical to the rotational direction. In this embodiment, the manipulation unit 100 may be operated as an endless type manipulation system capable of performing endless rotation irrespective of the rotational direction, as shown in FIG. 4(a).

In another embodiment, the controller may increase the intensity of the electromagnets in a direction opposite to the rotational direction, i.e. the electromagnets at the original departure position, as shown in FIG. 4(b), such that the manipulation unit 100 can return to the original position before rotary manipulation. In this embodiment, the manipulation unit 100 may be operated as a self-return type manipulation system, as shown in FIG. 4(c).

Next, click number variable control is described with reference to FIG. 5.

Figure 5:
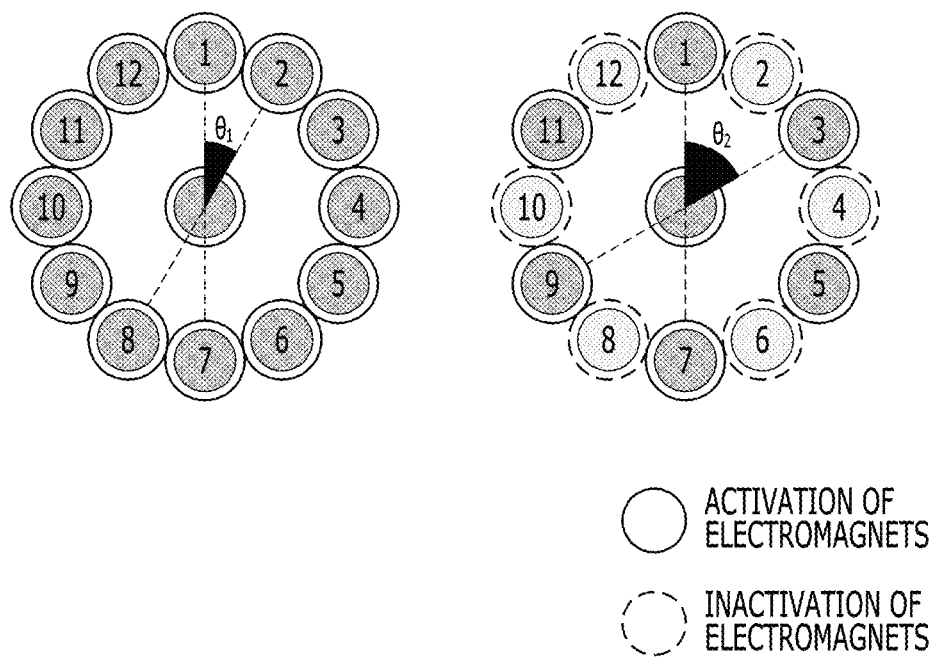
FIG. 5 is a view showing an example of the magnetic force control form of the rotary manipulation system according to the embodiment of the present disclosure depending on the number of clicks.

FIG. 5 is a view showing an example of the magnetic force control form of the rotary manipulation system according to the embodiment of the present disclosure depending on the number of clicks.

First, in the case in which all of the twelve peripheral electromagnets 221 are activated, like the left, the manipulation unit 100 may have twelve clicks for one rotation (i.e. a rotational angle per click θ1=30 degrees). On the other hand, in the case in which only half of the twelve peripheral electromagnets are alternately activated, like the right, the manipulation unit 100 may have six clicks for one rotation (i.e. a rotational angle per click θ2=60 degrees). Of course, in any case, manipulation torque per click may be changed depending on the intensity of current applied to the activated peripheral electromagnets by the controller.

Figure 6A:
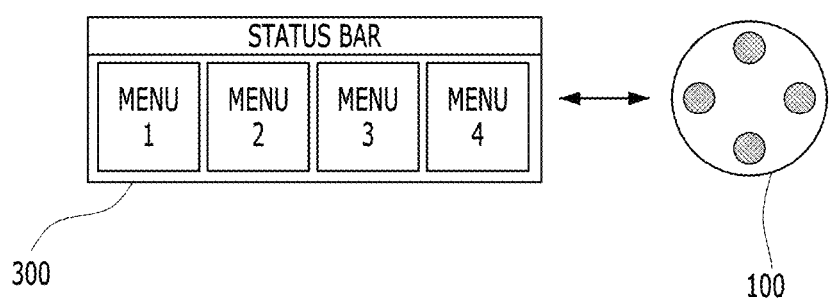
FIGS. 6(a) and 6(b) are views showing an example of the magnetic force control form of the rotary manipulation system according to the embodiment of the present disclosure depending on the construction of an object to be controlled.
Figure 6B:
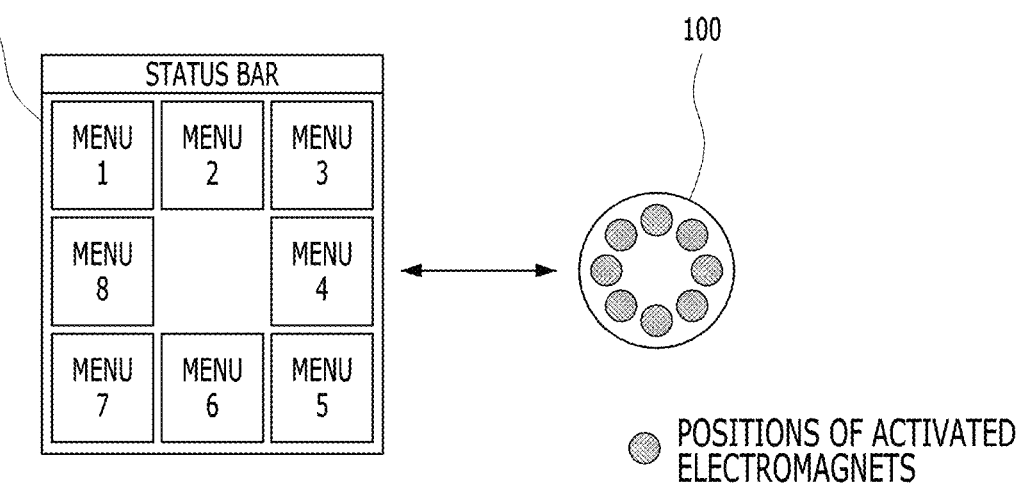

FIGS. 6(a) and 6(b) are views showing an example of the magnetic force control form of the rotary manipulation system according to the embodiment of the present disclosure depending on the construction of an object to be controlled.

In FIGS. 6(a) and 6(b), the case in which individual menus constituting functions to be controlled are output through a display 300 in the vehicle, the plurality of menus is included, and one menu is moved per click is assumed.

First, in the case in which four individual menus are provided, as shown in FIG. 6(a), the peripheral electromagnets 221 may be selectively activated such that the manipulation unit 100 has four clicks for one rotation.

In another embodiment, in the case in which eight individual menus are provided, as shown in FIG. 6(b), the peripheral electromagnets 221 may be selectively activated such that the manipulation unit 100 has eight clicks for one rotation.

Of course, in another embodiment, the peripheral magnets 121 and the peripheral electromagnets 221 are provided in numbers corresponding to integer multiples of the click number based on the menus in order to equally divide the rotational angle per click.

As a result, the user may perform more intuitive manipulation, and the controller may increase the intensity of magnetic force of the peripheral electromagnets when manipulation in the direction toward the last menu is sensed such that rotary manipulation is performed no more for the last one of the provided menus. Thus, haptic feedback on the total number of menus is provided. Consequently, blind control may be further easily performed during driving.

Figure 7:
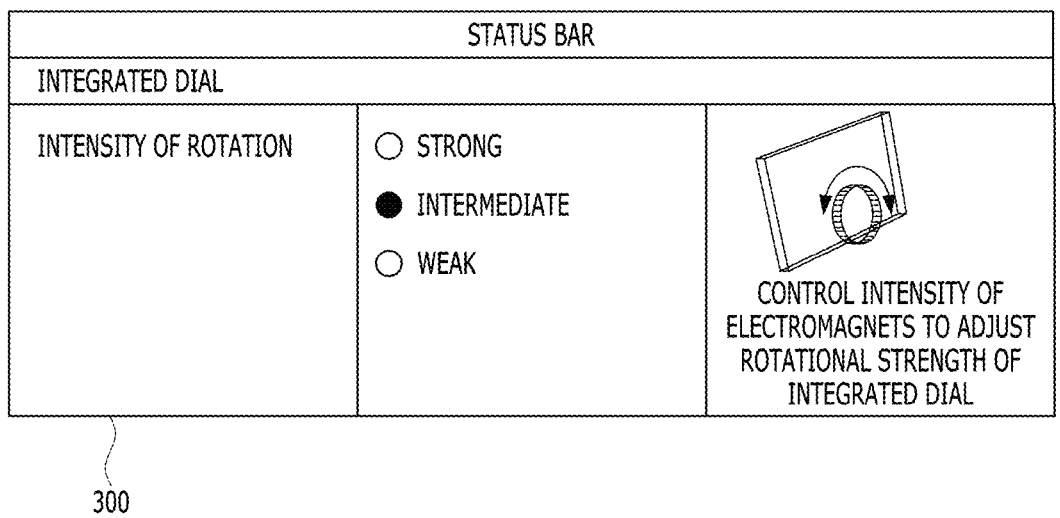
FIG. 7 is a view showing an example of the construction of a user interface for adjusting rotational intensity of the rotary manipulation system according to the embodiment of the present disclosure.

FIG. 7 is a view showing an example of the construction of a user interface for adjusting rotational intensity of the rotary manipulation system according to the embodiment of the present disclosure.

Referring to FIG. 7, a personalization setting menu may be provided through the display 300 in the vehicle such that the intensity of magnetic force can be adjusted, since people have different grasping forces and wrist forces. For example, the personalization setting menu may be provided through a user setting mode (USM) of a head unit or an audio/video/navigation (AVN) system. As a result, magnetic force suitable for an individual's situation may be provided. Thus, usability may be improved.

In another embodiment, the personalization setting menu is selected/manipulated only when shifting into P is performed in a transmission during stopping in order to prevent an accident during driving, and logic is set such that no gear shift is performed in the P state of the transmission until the manipulation unit 100 is attached to the attachment surface 210 and settings are completed. In the case in which gear shift is performed after attachment, magnetic force may be automatically temporarily increased in order to prevent detachment at the time of starting.

FIGS. 8(a)-8(d) are views showing an example of the magnetic force control form of the rotary manipulation system according to the embodiment of the present disclosure for forward directional alignment.

In the case in which the manipulation unit is not circular or regularly polygonal, directivity is required. For example, in the case in which a protrusion 130 is provided at a portion of the edge of the manipulation unit 100, as shown in FIGS. 8(a)-(d), or in the case in which a display is disposed on the manipulation unit 100, whereby directivity is required, an automatic alignment function may be provided. To this end, in FIGS. 8(a)-8(d), polarities of the peripheral magnets 121 may be alternately changed in one rotational direction.

Referring to FIG. 8(a), the situation in which even peripheral magnets 121 have N polarities, odd peripheral magnets 121 have S polarities, the protrusion 130 is disposed in the direction in which the first magnet is disposed, and the form in which the protrusion faces upwards is the forward direction intended at the time of manufacture is assumed. In addition, control is performed such that polarities of the peripheral electromagnets 221 are alternately changed. When the user attaches the manipulation unit 100 to the attachment surface 210 such that the protrusion 130 is directed to 2 o'clock in this state, as shown in FIG. 8(b), the controller may determine the direction in which the manipulation unit 100 is attached and may start to perform forward-direction alignment control.

Specifically, as shown in FIG. 8(c), two-click rotation must be performed in the counterclockwise direction for forward-direction alignment of the manipulation unit 100. Therefore, the controller may control the peripheral electromagnets 221 such that repulsive force is generated between the peripheral magnets 121 and the peripheral electromagnets 221 in the clockwise direction. Attractive force is generated between the peripheral magnets 121 and the peripheral electromagnets 221 in the counterclockwise direction. The peripheral electromagnets 221 may be controlled such that polarities of the peripheral electromagnets 221 are alternately changed at the time of every one-click rotation such that attractive force and repulsive force sequentially applied to the peripheral magnets cause rotation of the manipulation unit 100 in the counterclockwise direction.

Subsequently, as shown in FIG. 8(d), in the case in which the manipulation unit 100 is aligned in the forward direction, the controller may control the peripheral electromagnets such that attractive force is applied between the overlapping peripheral magnets 121 and peripheral electromagnets 221.

In the case in which the user attaches the manipulation unit 100 to a desired position, the manipulation unit 100 may be aligned in the forward direction. Thus, usability may be improved.

In order to provide such a function, however, it is necessary for the controller to determine the forward direction of the manipulation unit 100. To this end, the intensity of magnetic force of a specific one of the peripheral magnets 121 (e.g. a first peripheral magnet) may be different from the intensity of magnetic force of the other peripheral magnets 121. In another embodiment, arrangement in polarity of at least some of the peripheral magnets 121 may be different from arrangement in polarity of the other peripheral magnets 121. For example, twelfth, first, and second peripheral magnets may have the same polarity, and the other third to eleventh magnets may have alternately changed polarities. Of course, this arrangement is illustrative, and the arrangement is not limited as long as the controller is capable of determining the direction in which the manipulation unit 100 is disposed.

Figure 9A:
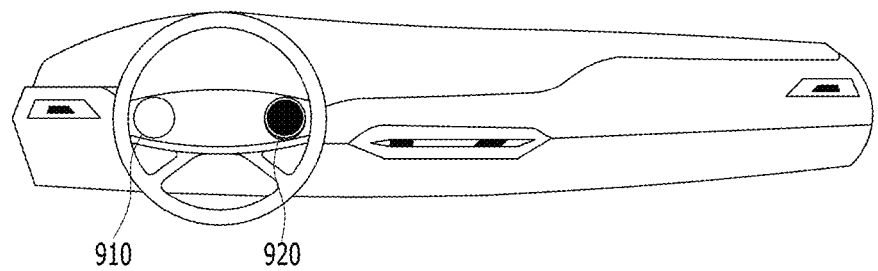
FIGS. 9(a)-9(c) are views showing attachment areas according to an embodiment of the present disclosure.
Figure 9B:
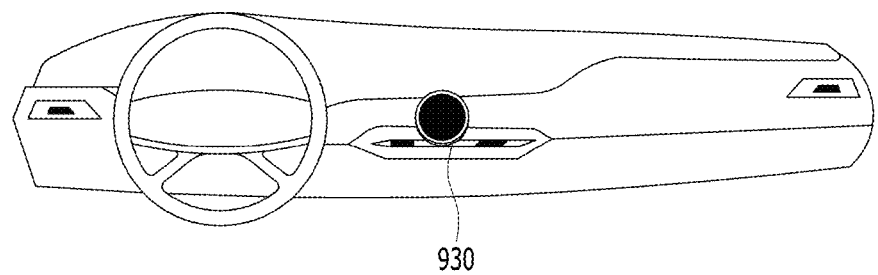
Figure 9C:
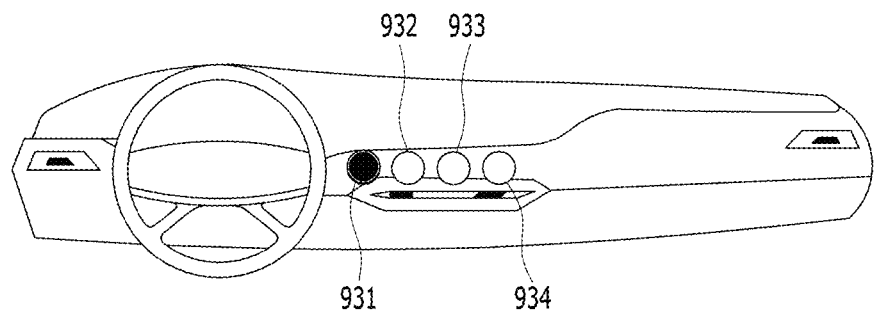

FIGS. 9(a)-9(c) are views showing attachment areas according to an embodiment of the present disclosure.

Referring to FIG. 9(a), the attachment area in which the attachment surface 210 of the attachment unit 200 is located may be a point 910 or 920 on a steering wheel. In another embodiment, as shown in FIG. 9(b), an attachment area 930 may be disposed at the middle of a center fascia.

Of course, in some embodiments, a plurality of attachment areas 931, 932, 933, and 934 may be provided at the middle of the center fascia, as shown in FIG. 9(c). In this embodiment, a plurality of manipulation units 100 may be simultaneously attached to constitute a portion of the manipulation system, and different functions to be controlled may be provided depending on the attachment area.

For example, in the case in which the manipulation unit 100 is attached to the leftmost attachment area 931, an air conditioner may be directly controlled through the manipulation unit 100 attached to the attachment area 931. In the case in which the manipulation unit 100 is attached to the rightmost attachment area 934, the volume of a multimedia output may be directly controlled. Of course, such function assignment is illustrative, and it should be apparent to those having ordinary skill in the art that the present disclosure is not limited thereto, and various changes are possible.

A process of controlling the rotary manipulation system according to the embodiments of the present disclosure described above may be summarized as shown in FIG. 10.

Figure 10:
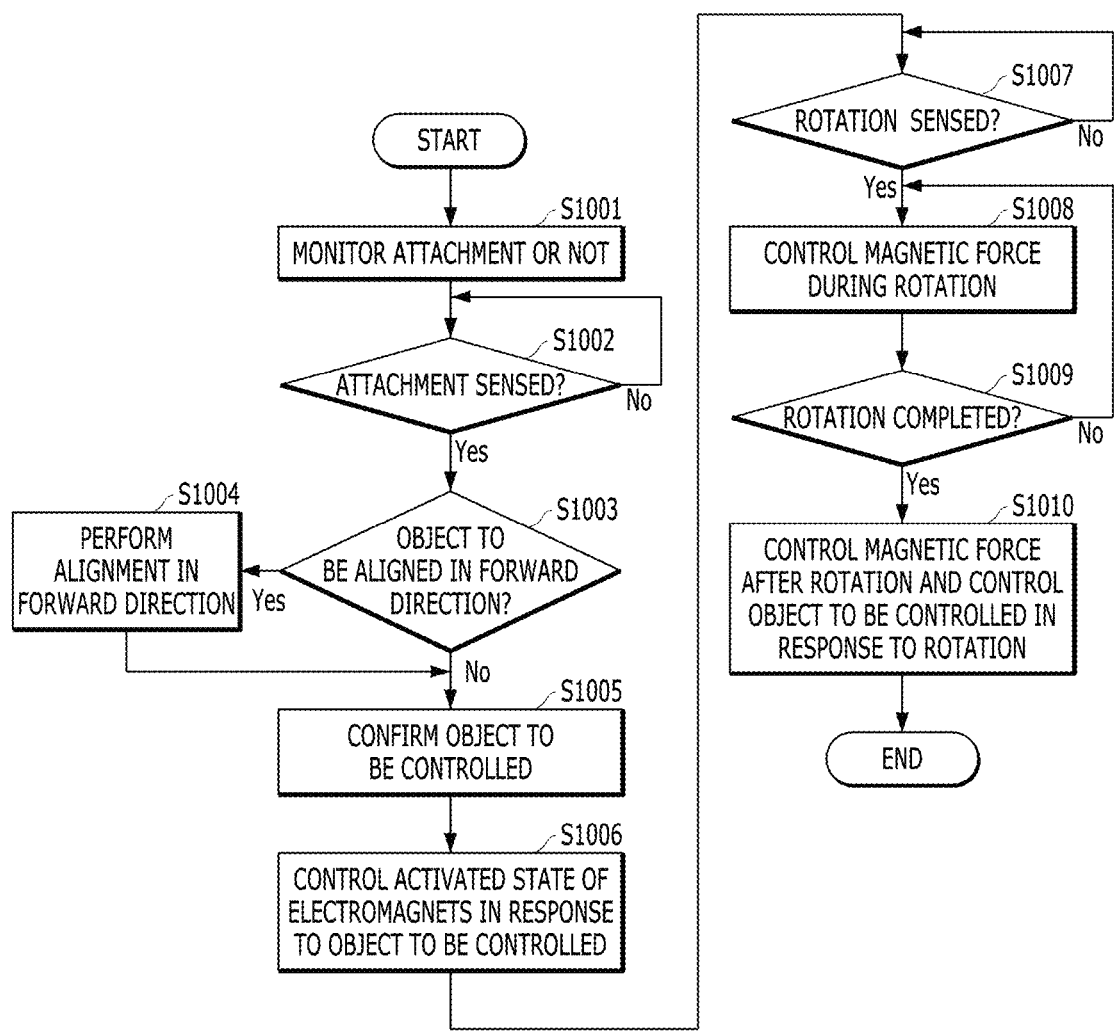
FIG. 10 is a flowchart showing an example of a process of controlling a rotary manipulation system according to an embodiment of the present disclosure.

FIG. 10 is a flowchart showing an example of a process of controlling a rotary manipulation system according to an embodiment of the present disclosure.

Referring to FIG. 10, the controller of the attachment unit 200 may monitor a change in current of the electromagnets 220 to monitor attachment of the manipulation unit 100 or not (S1001).

During monitoring, the controller may sense attachment of the manipulation unit 100 or not based on a change in current due to at least one portion of the body of the user contacting the manipulation unit 100 or approach of the manipulation unit 100 to the magnets 120 (S1002).

In the case in which the attachment of the manipulation unit 100 is sensed (YES of S1002), the controller may determine whether the manipulation unit 100 is to be aligned in the forward direction (S1003). Whether the manipulation unit 100 is to be aligned may be determined by determining whether a change in magnetic force of a specific peripheral electromagnet is different from a change in magnetic force of the other peripheral electromagnets or whether a polar pattern of some of the electromagnets is different from a polar pattern of the other electromagnets.

In the case in which the manipulation unit 100 is to be aligned, forward-direction alignment control may be performed (S1004).

Of course, in some embodiments, step S1003 and step S1004 may be omitted.

When the manipulation unit 100 is attached or forward-direction alignment of the manipulation unit 100 is completed, the controller confirms a function to be controlled, i.e. an object to be controlled, through rotational manipulation of the manipulation unit 100 (S1005). When determining the object to be controlled, the controller may consider at least one of the position of the attachment surface 210 to which the manipulation unit 100 is attached, a currently enabled function, or a current driving situation. The position of the attachment surface 210 is the same as described with reference to FIG. 9(*c*), and a function displayed on the display of the AVN system may be considered as the currently enabled function. Also, in the case of the driving situation, a function causing driver distraction during driving may be excluded from the object to be controlled. In addition, confirmation of the object to be controlled may also include confirmation of construction of menus of the object to be controlled and confirmation of a corresponding manipulation system type.

Consequently, the controller may control the activated state of the electromagnets so as to correspond to the object to be controlled (S1006). For example, the controller may determine the manipulation system type, such as an endless type or a self-return type, as described previously with reference to FIGS. 4(*a*)-4(*c*), depending on the object to be controlled. In another example, the controller may determine the number of clicks or whether to apply rotation preventing control corresponding to the last menu, as described previously with reference to FIGS. 5 and 6, depending on the construction of the menus of the object to be controlled.

Subsequently, when rotation of the manipulation unit 100 is sensed (S1007), the controller may reduce magnetic force of the peripheral electromagnets during rotation, as described previously with reference to FIGS. 3(*a*)-3(*e*). Alternatively, the controller may control a change in magnetic force based on the manipulation system type whenever rotation is performed by a predetermined angle, as described previously with reference to FIGS. 4(*a*)-4(*c*) Thus, magnetic force may be controlled during rotation (S1008).

When completion of rotation of the manipulation unit 100 is sensed (S1009), the controller may fix the manipulation unit 100 to the position at which the rotation is completed or return the manipulation unit 100 to the initial rotational position based on a manipulation system type corresponding to the object to be controlled. Thus, magnetic force may be controlled after rotation, and may control a function to be controlled in response to the sensed rotational direction and angle (S1010).

The rotary manipulation system using the electromagnets according to the embodiments of the present disclosure described above and the method of controlling the same may have the following effects.

First, it is possible to increase the degree of freedom in design of the manipulation system in the vehicle and to improve intuitive usability due to switch reduction. In another example, center fascia/floor console switches may be integrated through integration of functions.

In addition, since the manipulation system is attached/detached using magnetic force, usability is improved. In other words, since magnetic force of permanent magnets or electromagnets is utilized, instead of a mechanical structure for fixing the manipulation unit to the attachment surface, attachment is achieved simply by moving the manipulation unit close to the attachment surface. Thus, convenience is improved.

Furthermore, it is not necessary to confirm the degree of manipulation with the naked eye, which is accompanied by forward attention neglect, during driving due to a haptic manipulation sensation through a change in magnetic force.

The present disclosure described above may be implemented as a computer-readable program stored in a computer-readable recording medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

As apparent from the above description, it is possible to more conveniently manipulate functions through the detachable rotary manipulation system according to at least one embodiment of the present disclosure constructed as described above.

In an embodiment, it is possible to correspond to various user interfaces through selective activation of the electromagnets disposed at the vehicle side and to provide a variable manipulation form and manipulation sensation.

It should be appreciated by those having ordinary skill in the art that the effects achievable through the present disclosure are not limited to those that have been particularly described hereinabove and that other effects of the present disclosure should be more clearly understood from the above detailed description.

The above detailed description is not to be construed as limiting the present disclosure in any aspect but is to be considered by way of embodiments. The scope of the present disclosure should be determined by reasonable interpretation of the accompanying claims, and all equivalent modifications made without departing from the scope of the present disclosure should be understood as being included in the following claims.

What is claimed is:

1. A method of controlling a detachable rotary manipulation system, the method comprising:
   determining whether a rotary manipulation unit having a plurality of magnets disposed thereat has been attached based on a change in current of a plurality of electromagnetic coils disposed at an attachment unit; and
   controlling whether to activate at least some of the plurality of electromagnetic coils based on at least one of a number of clicks per rotation corresponding to a function to be controlled or a manipulation system type of the rotary manipulation unit upon determining that the rotary manipulation unit has been attached.

2. The method according to claim 1, wherein
   the plurality of magnets comprises a central magnet and a plurality of peripheral magnets radially disposed about the central magnet, and
   the plurality of electromagnetic coils comprises a central coil and a plurality of peripheral coils radially disposed about the central coil.

3. The method according to claim 2, wherein a distance between the central magnet and each of the plurality of peripheral magnets is equal to a distance between the central coil and each of the plurality of peripheral coils.

4. The method according to claim 3, wherein an angle between the plurality of peripheral magnets has a multiple relationship with an angle between the plurality of peripheral coils.

5. The method according to claim 2, wherein the function to be controlled is determined in consideration of at least one of an in-vehicle position of an attachment surface to which the rotary manipulation unit has been attached, a currently enabled function, or a current driving situation.

6. The method according to claim 2, wherein
   the number of clicks per rotation corresponds to a number of menus of the function to be controlled, and
   the controlling comprises selectively enabling peripheral coils corresponding in quantity to the number of clicks per rotation among the plurality of peripheral coils.

7. The method according to claim 2, wherein
   the plurality of peripheral magnets and the plurality of peripheral coils have polarities different from polarities of peripheral magnets adjacent thereto, and
   the controlling comprises:
   determining whether the rotary manipulation unit is disposed in a forward direction; and
   alternately changing the polarities of the plurality of peripheral coils to rotate the rotary manipulation unit such that the rotary manipulation unit is disposed in the forward direction upon determining that the rotary manipulation unit is not disposed in the forward direction.

8. The method according to claim 2, wherein the controlling comprises:
   sensing whether the rotary manipulation unit has been rotated based on the change in current of the plurality of electromagnetic coils; and
   reducing the current of the plurality of peripheral coils upon sensing that the rotary manipulation unit has been rotated.

9. The method according to claim 8, wherein the controlling further comprises increasing magnetic force of a next peripheral coil located in a rotational direction of the rotary manipulation unit, among the plurality of peripheral coils, or a peripheral coil located at an initial rotational position depending on the manipulation system type corresponding to the function to be controlled.

10. A non-transitory computer readable recording medium containing a program for performing the method according to claim 1.

11. A manipulation apparatus for vehicles, the manipulation apparatus comprising:
    a plurality of electromagnetic coils disposed along an attachment unit; and
    a controller configured to determine whether a rotary manipulation unit having a plurality of magnets disposed thereat has been attached based on a change in current of the plurality of electromagnetic coils and to control whether to activate at least some of the plurality of electromagnetic coils based on at least one of a number of clicks per rotation corresponding to a function to be controlled or a manipulation system type of the rotary manipulation unit upon determining that the rotary manipulation unit has been attached.

12. The manipulation apparatus according to claim 11, wherein
    the plurality of magnets comprises a central magnet and a plurality of peripheral magnets radially disposed about the central magnet, and
    the plurality of electromagnetic coils comprises a central coil and a plurality of peripheral coils radially disposed about the central coil.

13. The manipulation apparatus according to claim 12, wherein a distance between the central magnet and each of the plurality of peripheral magnets is equal to a distance between the central coil and each of the plurality of peripheral coils.

14. The manipulation apparatus according to claim 13, wherein an angle between the plurality of peripheral magnets has a multiple relationship with an angle between the plurality of peripheral coils.

15. The manipulation apparatus according to claim 12, wherein the controller determines the function to be controlled in consideration of at least one of an in-vehicle position of an attachment surface to which the rotary manipulation unit has been attached, a currently enabled function, or a current driving situation.

16. The manipulation apparatus according to claim 12, wherein
    the number of clicks per rotation corresponds to a number of menus of the function to be controlled, and
    the controller selectively activates peripheral coils corresponding in quantity to the number of clicks per rotation among the plurality of peripheral coils.

17. The manipulation apparatus according to claim 12, wherein
    the plurality of peripheral magnets and the plurality of peripheral coils have polarities different from polarities of peripheral magnets adjacent thereto, and
    the controller determines whether the rotary manipulation unit is disposed in a forward direction, and alternately changes the polarities of the plurality of peripheral coils to rotate the rotary manipulation unit such that the rotary manipulation unit is disposed in the forward direction upon determining that the rotary manipulation unit is not disposed in the forward direction.

18. The manipulation apparatus according to claim 12, wherein the controller senses whether the rotary manipulation unit has been rotated based on the change in current of the plurality of electromagnetic coils and reduces the current of the plurality of peripheral coils upon sensing that the rotary manipulation unit has been rotated.

19. The manipulation apparatus according to claim 18, wherein the controller increases magnetic force of a next peripheral coil located in a rotational direction of the rotary manipulation unit, among the plurality of peripheral coils, or a peripheral coil located at an initial rotational position depending on the manipulation system type corresponding to the function to be controlled.

\* \* \* \* \*